US00RE41442E

(19) United States
(12) Reissued Patent
Morgan et al.

(10) Patent Number: US RE41,442 E
(45) Date of Reissued Patent: Jul. 20, 2010

(54) INSULATED REMOVABLE POND COVER

(75) Inventors: William Deyo Morgan, Bloomington, MN (US); Michael Allan Morgan, Edina, MN (US)

(73) Assignee: Industrial & Environmental Concepts, Inc., Edina, MN (US)

(21) Appl. No.: 08/828,330

(22) Filed: Mar. 28, 1997

Related U.S. Patent Documents

Reissue of:
(64) Patent No.: 5,400,549
Issued: Mar. 28, 1995
Appl. No.: 08/139,835
Filed: Oct. 22, 1993

(51) Int. Cl.
*E04B 7/00* (2006.01)
*B65D 88/34* (2006.01)
*E04H 4/10* (2006.01)
*C02F 1/00* (2006.01)

(52) U.S. Cl. ..... 52/23; 52/5; 4/498; 160/231.1; 220/216; 210/DIG. 9

(58) Field of Classification Search ..... 52/3–5, 52/309.9, 222, DIG. 13, 23, 408, 409, 745.06, 52/745.1, 748.1, 502.1, 63; 4/498, 503; 160/231.1; 403/291, 393; 210/DIG. 9; 220/216; 405/129.45, 405/129.9

See application file for complete search history.

(56) References Cited

U.S. PATENT DOCUMENTS 2,952,024 A * 9/1960 Bartolucci
3,004,769 A * 10/1961 Turner
3,104,775 A * 9/1963 Champagnat ..... 220/220
3,148,384 A * 9/1964 Bartolucci et al.
3,313,443 A 4/1967 Dial et al. ..... 220/219
3,330,118 A 7/1967 Biais ..... 405/53
3,355,745 A * 12/1967 Jannuzzi
3,374,918 A * 3/1968 Creith ..... 220/216
3,420,022 A * 1/1969 Brock ..... 52/302.1
3,462,040 A * 8/1969 James ..... 220/208
3,572,506 A 3/1971 Bandy et al. ..... 210/86
3,683,428 A * 8/1972 Morris
3,862,876 A * 1/1975 Graves
3,933,628 A 1/1976 Varani ..... 210/12
3,980,199 A 9/1976 Kays ..... 220/227
3,991,900 A 11/1976 Burke et al. ..... 220/219
4,038,447 A * 7/1977 Brock ..... 428/72
4,135,257 A * 1/1979 Lof
4,137,575 A * 2/1979 Klaffke et al.
4,139,117 A 2/1979 Dial ..... 220/218
4,169,050 A * 9/1979 Serfling et al.

(Continued)

FOREIGN PATENT DOCUMENTS

CA 1253266 4/1989
CA 2060479 8/1992
CA 2096852 8/1992
CA 2116354 2/1994
CA 2102590 5/1994
CA 2173831 4/1995
DE 2004656 * 8/1971
WO WO 93/11330 * 6/1993

OTHER PUBLICATIONS

"Proposals for Pond Membrane," Nov. 8, 1984.

Parsons, "On–farm biogas production," Cooperative Extension, Northeast Regional Agricultural Engineering Service, 1984.

*Primary Examiner*—Robert J Canfield
(74) *Attorney, Agent, or Firm*—Fulbright & Jaworski L.L.P.

(57) ABSTRACT

An insulated removeable pond cover for settling ponds. The pond cover comprises a plurality of sealed panel units containing insulation. The panel units are linked together by means of a system of cables which pass through grommets in the panel units.

36 Claims, 5 Drawing Sheets

U.S. PATENT DOCUMENTS 4,192,025 A * 3/1980 Hinsperger
4,197,595 A * 4/1980 Dearing
4,244,819 A 1/1981 Ballu ..... 210/242.3
4,294,589 A 10/1981 Zachary ..... 55/36
4,438,863 A * 3/1984 Wilson et al. ..... 220/227
4,503,988 A 3/1985 Gerber ..... 220/219
4,590,714 A * 5/1986 Walker
4,603,790 A 8/1986 Gerber ..... 220/219
4,620,396 A * 11/1986 Bjorntwedt
4,672,691 A 6/1987 De Garie et al. ..... 4/499
4,678,375 A 7/1987 Gagle et al. ..... 405/270
4,749,606 A * 6/1988 Moore ..... 428/166
4,780,351 A * 10/1988 Czempoyesh ..... 428/122
4,916,937 A 4/1990 Robertson et al. ..... 405/270
5,022,101 A * 6/1991 Gosselin et al.
5,050,341 A * 9/1991 Breezer et al. ..... 47/59 R
5,067,182 A * 11/1991 Koelsch
5,074,427 A * 12/1991 Siemerink et al. ..... 220/218
5,197,239 A * 3/1993 Glynn et al.
5,265,976 A 11/1993 Russell ..... 405/52
5,505,848 A 4/1996 Landine et al. ..... 210/170
5,546,615 A * 8/1996 Chamness
5,562,759 A * 10/1996 Morgan et al.
5,587,080 A 12/1996 Landine et al. ..... 210/603
5,652,972 A * 8/1997 Chartrand ..... 4/506
5,861,095 A * 1/1999 Vogel et al. ..... 210/605
6,047,415 A * 4/2000 Brown ..... 4/498
6,136,194 A * 10/2000 Vogel et al. ..... 210/605
6,505,445 B2 * 1/2003 Johnson et al. ..... 52/223.3
6,508,247 B1 * 1/2003 Karales ..... 126/564
2003/0066789 A1 * 4/2003 Morgan et al. ..... 210/120
2003/0070365 A1 * 4/2003 Martin ..... 52/3

* cited by examiner

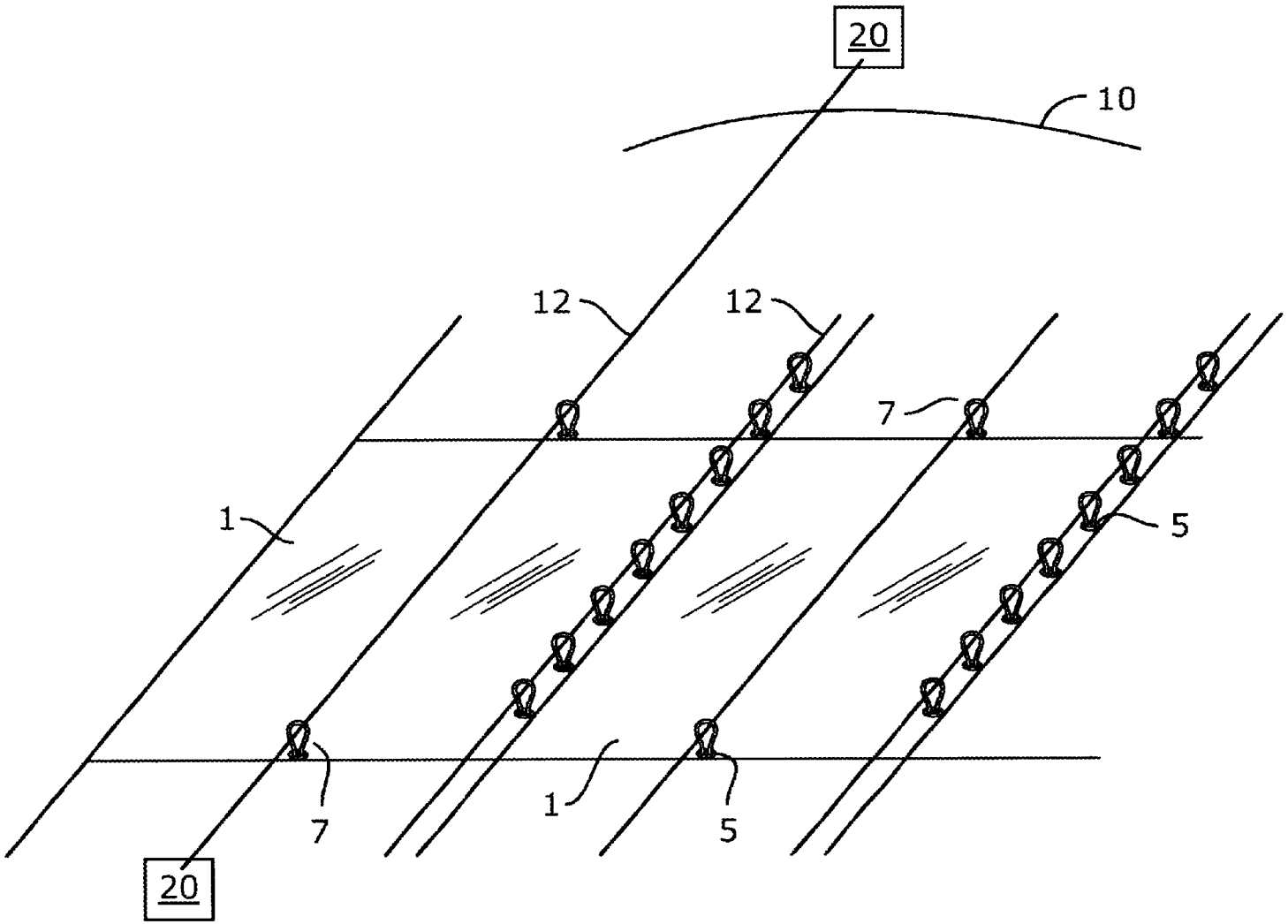
FIG. 2
AMENDED

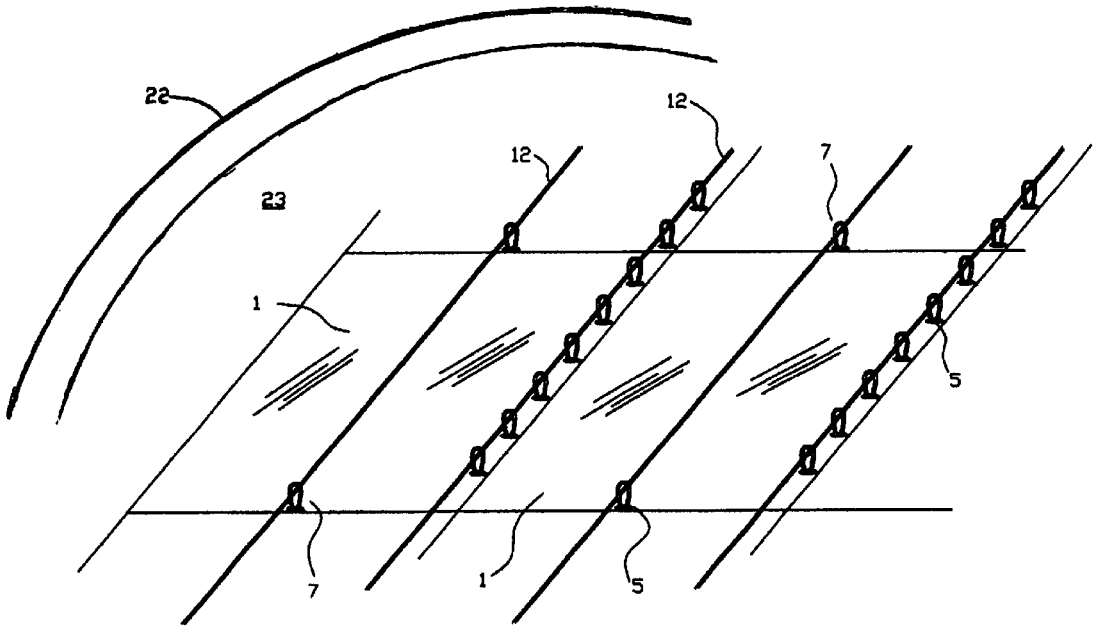
FIG. 3 AMENDED

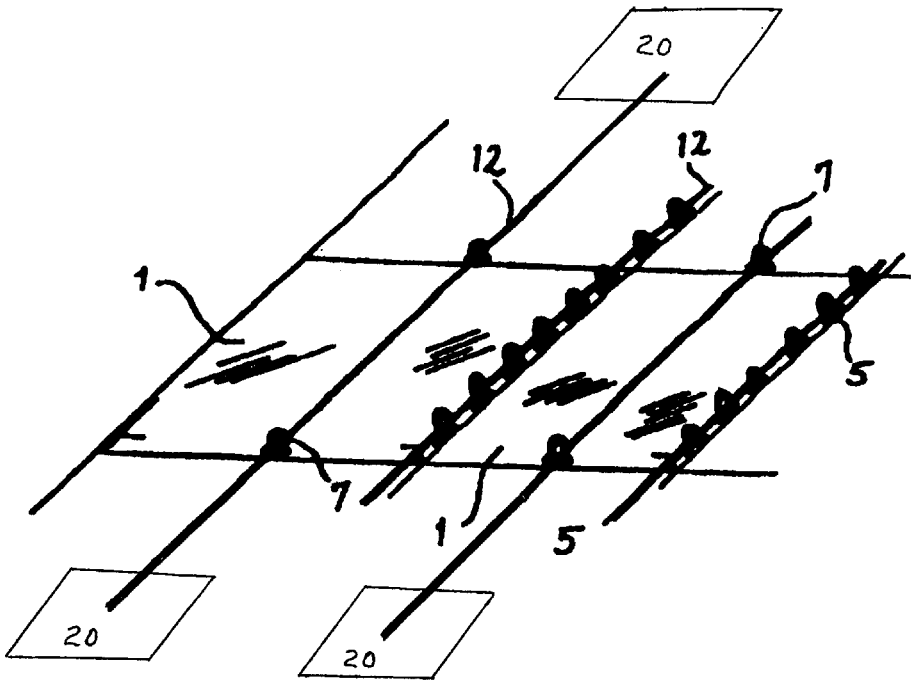
FIG. 4. amended

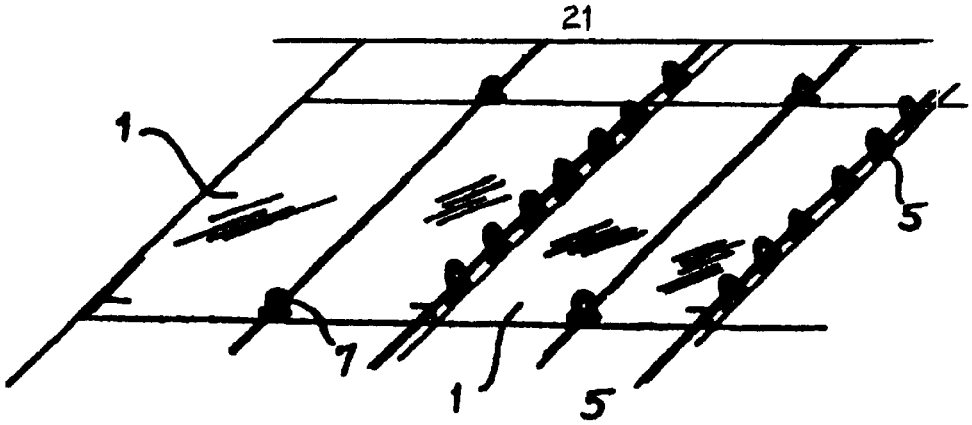
FIG. 5. amended

INSULATED REMOVABLE POND COVER

Matter enclosed in heavy brackets [ ] appears in the original patent but forms no part of this reissue specification; matter printed in italics indicates the additions made by reissue.

SUMMARY AND BACKGROUND OF THE INVENTION

Man-made, usually rectangular, settling ponds are used for holding sewage and industrial wastes, *which are examples of wastewater*. These ponds are usually covered by a large one-piece geomembrane which has gas and water collection systems and is usually not insulated. These pond covers are laid on-site and secured by an anchoring trench. Because of their size, they are difficult to remove.

The present invention is an insulated removable pond cover which is made in sections which are held together by means of a series of grommets and cables. The cables are secured to a series of concrete deadheads.

The primary advantage of the invention is that it is removable, thus allowing the pond to be dredged and re-used. Another advantage is that the insulation results in heat being retained in the pond, thus speeding biodegradation of organic material.

DESCRIPTION OF THE DRAWINGS

FIG. 2 is a top perspective view showing two full panels and parts of four other panels, starting from one edge of the pond cover on the left.

*FIG. 3 is the view of FIG. 2 further showing a tank or pond and aqueous solution.*

*FIG. 4 is the view of FIG. 2 further showing an anchor.*

*FIG. 5 is the view of FIG. 2 further showing an anchoring trench.*

DESCRIPTION OF THE INVENTION

Figure 1:
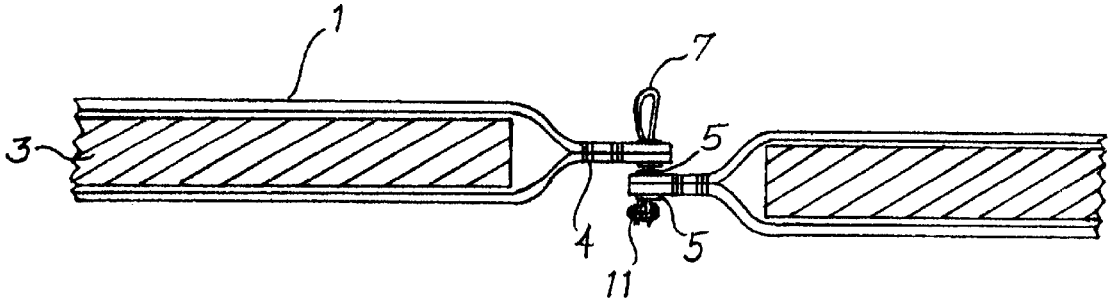
FIG. 1 is a side view of two of the panels.
Figure 1:
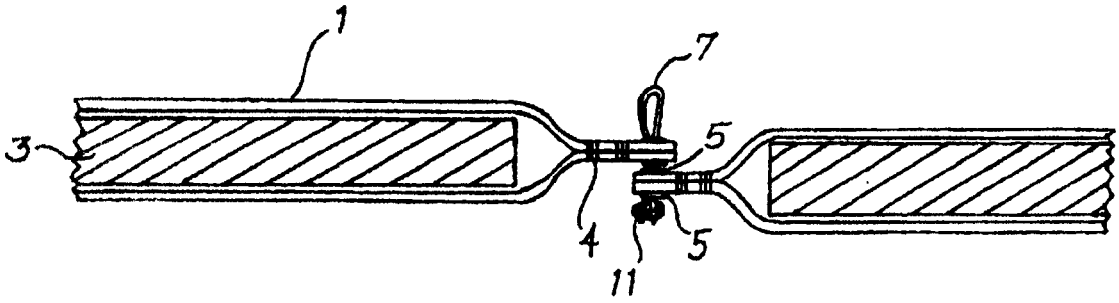

*The present invention is an insulated removable pond cover which is made in sections which are held together by means of a series of grommets 5 and cables 12. The cables 12 are secured to a series of concrete deadheads or anchors 20. These pond covers are laid on site and may be secured by an anchoring trench 21. The pond cover may overlie a pond, tank or other such container 22 known to those skilled in the art. Such container 22 may hold an aqueous solution 23 or other material known to those having ordinary skill in the art.*

The pond cover comprises a plurality of generally rectangular casings or panel units 1 linked together. The number and size of the casings 1 will vary depending upon the size of the pond to be covered, and the casings 1 are arranged in as many rows as are needed. Generally each casing 1 will be about seven and one-half feet wide and approximately forty feet long. Each casing 1 is filled with a layer of insulation 3 and then sealed at either end and along either side by a fusion weld 4. The casings 1 are made of a geomembrane (a high density polyethylene material).

Adjacent casings 1 are linked together in overlapping spaced relationship by means of a grommet and cable system. Each casing 1 is provided with a plurality of grommets 5 at either end and along either side, positioned outside of the welded area 4 so as to not break the seal. The total number of grommets 5 per casing 1 can vary. After the grommets 5 of adjacent casings 1 are lined up in vertical spaced relationship to each other, a cable 7 is passed through the openings of the grommets 5, is formed into a loop above the panels 1 and is secured in position by a cable clamp 11 attached to the cable 7 beneath the casings 1. A heavy tie-down cable 12 is then passed through all the loops of the cables 7 in the row and is secured at either end to an anchor post such as a concrete deadhead, in a conventional manner such as tying the cable 12 to a rod with a nut at either end and securing the cable 12 with a cable clamp. If wind getting underneath the cover is a problem, additional cables can be passed through the cable loops 7 perpendicular to cable 12 at either end and in the middle of the series of casings 1.

Once the pond cover has been secured in position, it will float upon the liquid in the pond, and it can be removed when the pond needs to be dredged.

We claim:

1. A pond cover comprising a plurality of panel units linked together; means for insulating said pond cover, said insulating means comprising a generally rectangular layer of insulation wherein each of said panel units is filled internally with said layer of insulation and is sealed at either end and along either side by welding; and means for linking said panel units together and securing said pond cover in position on a pond, said linking means comprising grommets disposed along said sealed end of each of said panel units, and each of said panel units is linked in vertical spaced relationship to an adjacent panel unit by at least one cable disposed through said vertical spaced grommets and formed into a loop projecting above said panel units, and said securing means including a second cable which is disposed through [the] *an* entire row of said loops and is anchored at either of its end to an anchoring means.

*2. The pond cover of claim 1, where the loops disposed through the grommets project both above and below the panel units.*

*3. The pond cover of claim 1, where the loops disposed about the second cable are disposed through said grommets.*

*4. A pond cover comprising:*

*a plurality of panel units linked together;*

*means for insulating the pond cover, the insulating means comprising a generally rectangular layer of insulation where each of the panel units is filled internally with the layer of insulation and is sealed at either end and along either side by welding; and*

*means for linking the panel units together and securing the pond cover in position on a pond, the linking means comprising grommets disposed along the sealed end of each of the panel units, and each of the panel units is linked in vertical spaced relationship to an adjacent panel unit by at least one cable disposed through the vertical spaced grommets and formed into a loop projecting above the panel units, and the securing means including a second cable which is disposed through a row of the loops and is anchored at either of its end to an anchoring means.*

*5. A cover and wastewater combination comprising:*

*wastewater that includes sewage and/or industrial waste;*

*at least two sealed panels positioned over the wastewater, each panel having a side characterized by an edge and a plurality of openings spaced apart from the edge; and*

*the openings in one of the panels being positioned above the openings in the other panel, and a fastener being disposed through at least two adjacent openings.*

*6. The cover and wastewater combination of claim 5, where the panels are rectangular.*

*7. The cover and wastewater combination of claim 5, where the panels comprise a geomembrane.*

*8. The cover and wastewater combination of claim 5, where the panels are approximately seven and one-half feet wide and approximately forty feet long.*

*9. The cover and wastewater combination of claim 5, where each panel includes insulation material sealed inside, but not completely filling, a void in the panel.*

*10. The cover and wastewater combination of claim 9, where the insulation material is sealed inside each panel by a weld.*

*11. The cover and wastewater combination of claim 9, where the insulation material is rectangular.*

*12. The cover and wastewater combination of claim 5, where the panels further comprises a grommet circumscribing each opening.*

*13. A cover and wastewater combination comprising:*

*wastewater that includes sewage and/or industrial waste; and*

*at least two sealed panels removably linked to each other, the panels being positioned over and in direct contact with the wastewater;*

*where each panel contains, but is not completely filled with, an insulation material.*

*14. The cover and wastewater combination of claim 13, where each panel comprises a geomembrane.*

*15. The cover and wastewater combination of claim 13, where the insulation material is sealed inside each panel by a weld.*

*16. The cover and wastewater combination of claim 13, where each panel includes multiple openings, the panels overlap, and the panels are removably linked to each other with fasteners.*

*17. A cover and wastewater combination comprising:*

*wastewater that includes sewage and/or industrial waste;*

*at least two sealed panels removably linked together in overlapping relationship over the wastewater; and*

*means for removably linking the panels in overlapping relationship, the means comprising fasteners and openings defined in each of the panels;*

*where the openings in one of the panels are positioned above the openings in another of the panels to form pairs of openings of different panels, and one of the fasteners is disposed through each pair of overlapping openings so as to removably link the overlapping panels.*

*18. A cover comprising:*

*a plurality of panels removably linked together, each panel comprising high density polyethylene material; and*

*insulation material sealed inside each panel;*

*where the insulation material inside each panel does not completely fill the panel.*

*19. The cover of claim 18, where each panel includes multiple openings, the panels overlap, and the panels are removably linked together with fasteners.*

*20. A cover comprising:*

*a plurality of panels configured for use over wastewater, the panels being removably linked together with fasteners disposed through overlapping openings of adjacent panel portions;*

*where each panel includes insulation material sealed inside, but not completely filling, a void in the panel.*

*21. The cover of claim 20, where each panel comprises geomembrane.*

*22. The cover of claim 21, where each panel includes multiple openings, the panels overlap, and the panels are removably linked together with fasteners.*

*23. A method of manipulating a cover comprising:*

*linking at least two panels such that the panels are adjacent to each other, where each panel includes insulation material that is sealed inside, but that does not completely fill, a void in the panel; and*

*disposing the panels over wastewater that includes sewage and/or industrial waste.*

*24. The method of claim 23, where each panel comprises geomembrane.*

*25. The method of claim 23, where the insulation material is rectangular.*

*26. The method of claim 23, where each panel comprises openings, and the linking includes placing a fastener through at least one pair of adjacent openings.*

*27. The method of claim 26, where the openings in each panel are adjacent to at least one edge of one side of the panel.*

*28. The method of claim 26, where the linking includes orienting the panels in an overlapping relationship.*

*29. The method of claim 28, further comprising:*

*anchoring the linked panels over the wastewater.*

*30. A method of covering wastewater, comprising:*

*disposing at least two panels over wastewater that includes sewage and/or industrial waste, where the at least two panels are linked to each other and each contains, but is not completely filled with, insulation material sealed inside it.*

*31. The method of claim 30, where each panel comprises geomembrane.*

*32. The method of claim 30, where the insulation material is rectangular.*

*33. The method of claim 30, where each panel comprises openings, and the linking includes placing a fastener through at least one pair of adjacent openings.*

*34. The method of claim 33, where the openings in each panel are adjacent to at least one edge of one side of the panel.*

*35. The method of claim 33, where the linking includes orienting the panels in an overlapping relationship.*

*36. The method of claim 35, further comprising:*

*anchoring the linked panels over the wastewater.*

* * * * *

UNITED STATES PATENT AND TRADEMARK OFFICE

CERTIFICATE OF CORRECTION

PATENT NO. : RE41,442 E
APPLICATION NO. : 08/828330
DATED : July 20, 2010
INVENTOR(S) : Morgan et al.

It is certified that error appears in the above-identified patent and that said Letters Patent is hereby corrected as shown below:

Please delete RE41,442 in its entirety and insert RE41,442 as attached

Signed and Sealed this
Twentieth Day of September, 2011

David J. Kappos

David J. Kappos
*Director of the United States Patent and Trademark Office*

(19) United States
(12) Reissued Patent
Morgan et al.

(10) Patent Number: US RE41,442 E
(45) Date of Reissued Patent: Jul. 20, 2010

(54) INSULATED REMOVABLE POND COVER

(75) Inventors: William Deyo Morgan, Bloomington, MN (US); Michael Allan Morgan, Edina, MN (US)

(73) Assignee: Industrial & Environmental Concepts, Inc., Edina, MN (US)

(21) Appl. No.: 08/828,330

(22) Filed: Mar. 28, 1997

Related U.S. Patent Documents

Reissue of:
(64) Patent No.: 5,400,549
Issued: Mar. 28, 1995
Appl. No.: 08/139,835
Filed: Oct. 22, 1993

(51) Int. Cl.
*E04B 7/00* (2006.01)
*B65D 88/34* (2006.01)
*E04H 4/10* (2006.01)
*C02F 1/00* (2006.01)

(52) U.S. Cl. ..... 52/23; 52/5; 4/498; 160/231.1; 220/216; 210/DIG. 9

(58) Field of Classification Search ..... 52/3–5, 52/309.9, 222, DIG. 13, 23, 408, 409, 745.06, 52/745.1, 748.1, 502.1, 63; 4/498, 503; 160/231.1; 403/291, 393; 210/DIG. 9; 220/216; 405/129.45, 405/129.9

See application file for complete search history.

(56) References Cited

U.S. PATENT DOCUMENTS

| | | | | | |
|---|---|---|---|---|---|
| 2,952,024 | A | * | 9/1960 | Bartolucci | |
| 3,004,769 | A | * | 10/1961 | Turner | |
| 3,104,775 | A | * | 9/1963 | Champagnat | 220/220 |
| 3,148,384 | A | * | 9/1964 | Bartolucci et al. | |
| 3,313,443 | A | | 4/1967 | Dial et al. | 220/219 |
| 3,330,118 | A | | 7/1967 | Biais | 405/53 |
| 3,355,745 | A | * | 12/1967 | Jannuzzi | |
| 3,374,918 | A | * | 3/1968 | Creith | 220/216 |
| 3,420,022 | A | * | 1/1969 | Brock | 52/302.1 |
| 3,462,040 | A | * | 8/1969 | James | 220/208 |
| 3,572,506 | A | | 3/1971 | Bandy et al. | 210/86 |
| 3,683,428 | A | * | 8/1972 | Morris | |
| 3,862,876 | A | * | 1/1975 | Graves | |
| 3,933,628 | A | | 1/1976 | Varani | 210/12 |
| 3,980,199 | A | | 9/1976 | Kays | 220/227 |
| 3,991,900 | A | | 11/1976 | Burke et al. | 220/219 |
| 4,038,447 | A | * | 7/1977 | Brock | 428/72 |
| 4,135,257 | A | * | 1/1979 | Lof | |
| 4,137,575 | A | * | 2/1979 | Klaffke et al. | |
| 4,139,117 | A | | 2/1979 | Dial | 220/218 |
| 4,169,050 | A | * | 9/1979 | Serfling et al. | |

(Continued)

FOREIGN PATENT DOCUMENTS

| | | | |
|---|---|---|---|
| CA | 1253266 | | 4/1989 |
| CA | 2060479 | | 8/1992 |
| CA | 2096852 | | 8/1992 |
| CA | 2116354 | | 2/1994 |
| CA | 2102590 | | 5/1994 |
| CA | 2173831 | | 4/1995 |
| DE | 2004656 | * | 8/1971 |
| WO | WO 93/11330 | * | 6/1993 |

OTHER PUBLICATIONS

"Proposals for Pond Membrane," Nov. 8, 1984.

Parsons, "On–farm biogas production," Cooperative Extension, Northeast Regional Agricultural Engineering Service, 1984.

*Primary Examiner*—Robert J Canfield
(74) *Attorney, Agent, or Firm*—Fulbright & Jaworski L.L.P.

(57) ABSTRACT

An insulated remoevable pond cover for settling ponds. The pond cover comprises a plurality of sealed panel units containing insulation. The panels units are linked together by means of a system of cables which pass through grommets in the panel units.

36 Claims, 2 Drawing Sheets

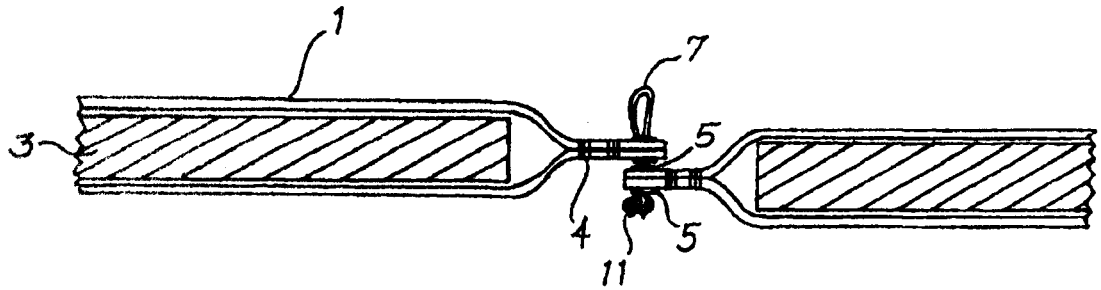

US RE41,442 E

Page 2

U.S. PATENT DOCUMENTS

| | | | | | |
|---|---|---|---|---|---|
| 4,192,025 | A | * | 3/1980 | Hinsperger | |
| 4,197,595 | A | * | 4/1980 | Dearing | |
| 4,244,819 | A | | 1/1981 | Ballu | 210/242.3 |
| 4,294,589 | A | | 10/1981 | Zachary | 55/36 |
| 4,438,863 | A | * | 3/1984 | Wilson et al. | 220/227 |
| 4,503,988 | A | | 3/1985 | Gerber | 220/219 |
| 4,590,714 | A | * | 5/1986 | Walker | |
| 4,603,790 | A | | 8/1986 | Gerber | 220/219 |
| 4,620,396 | A | * | 11/1986 | Bjorntwedt | |
| 4,672,691 | A | | 6/1987 | De Garie et al. | 4/499 |
| 4,678,375 | A | | 7/1987 | Gagle et al. | 405/270 |
| 4,749,606 | A | * | 6/1988 | Moore | 428/166 |
| 4,780,351 | A | * | 10/1988 | Czempoyesh | 428/122 |
| 4,916,937 | A | | 4/1990 | Robertson et al. | 405/270 |
| 5,022,101 | A | * | 6/1991 | Gosselin et al. | |
| 5,050,341 | A | * | 9/1991 | Breezer et al. | 47/59 R |
| 5,067,182 | A | * | 11/1991 | Koelsch | |
| 5,074,427 | A | * | 12/1991 | Siemerink et al. | 220/218 |
| 5,197,239 | A | * | 3/1993 | Glynn et al. | |
| 5,265,976 | A | | 11/1993 | Russell | 405/52 |
| 5,505,848 | A | | 4/1996 | Landine et al. | 210/170 |
| 5,546,615 | A | * | 8/1996 | Chamness | |
| 5,562,759 | A | * | 10/1996 | Morgan et al. | |
| 5,587,080 | A | | 12/1996 | Landine et al. | 210/603 |
| 5,652,972 | A | * | 8/1997 | Chartrand | 4/506 |
| 5,861,095 | A | * | 1/1999 | Vogel et al. | 210/605 |
| 6,047,415 | A | * | 4/2000 | Brown | 4/498 |
| 6,136,194 | A | * | 10/2000 | Vogel et al. | 210/605 |
| 6,505,445 | B2 | * | 1/2003 | Johnson et al. | 52/223.3 |
| 6,508,247 | B1 | * | 1/2003 | Karales | 126/564 |
| 2003/0066789 | A1 | * | 4/2003 | Morgan et al. | 210/120 |
| 2003/0070365 | A1 | * | 4/2003 | Martin | 52/3 |

* cited by examiner

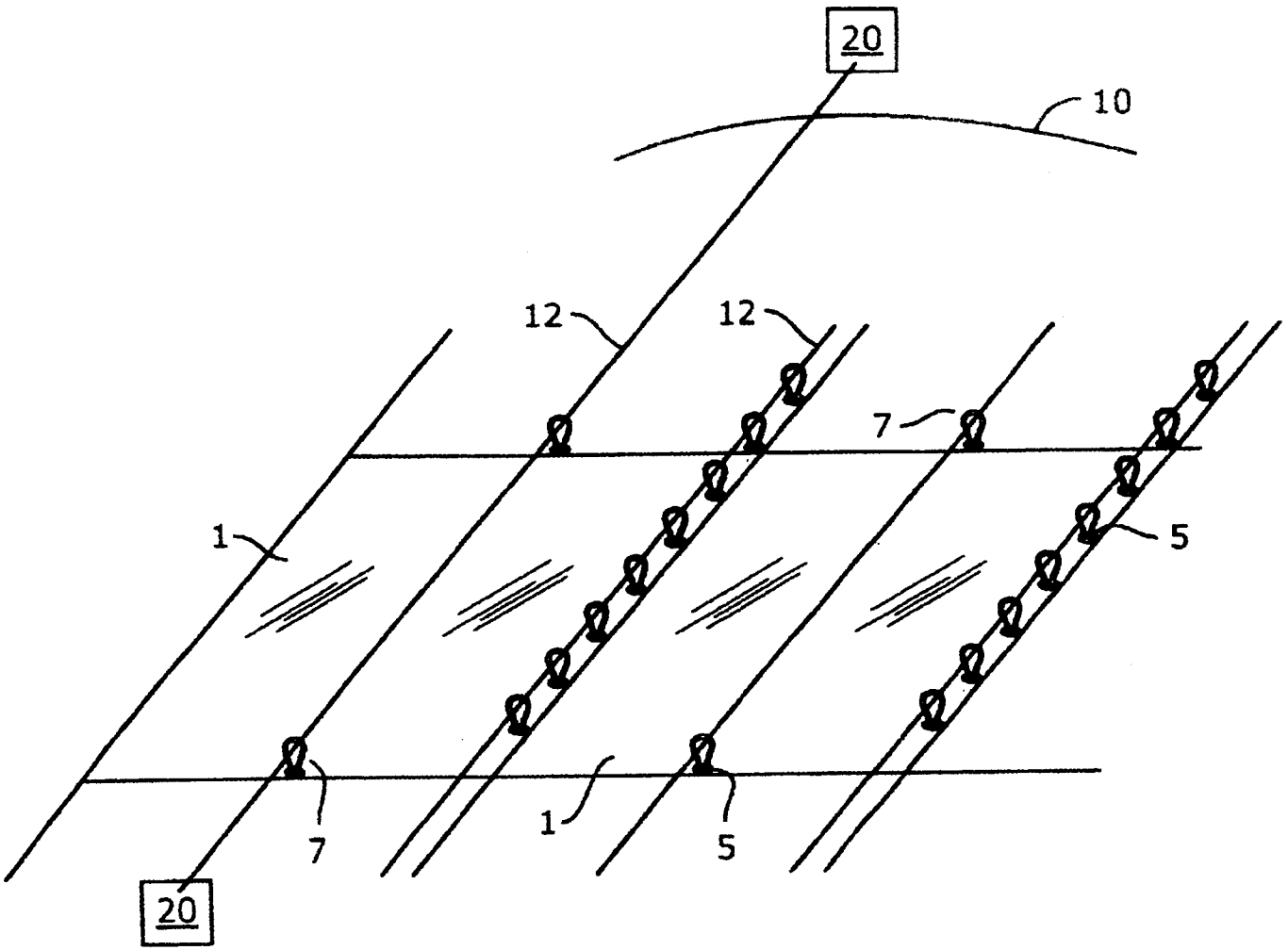
FIG. 2
AMENDED

INSULATED REMOVABLE POND COVER

Matter enclosed in heavy brackets [ ] appears in the original patent but forms no part of this reissue specification; matter printed in italics indicates the additions made by reissue.

SUMMARY AND BACKGROUND OF THE INVENTION

Man-made, usually rectangular, settling ponds are used for holding sewage and industrial wastes, *which are examples of wastewater*. These ponds are usually covered by a large one-piece geomembrane which has gas and water collection systems and is usually not insulated. These pond covers are laid on-site and secured by an anchoring trench. Because of their size, they are difficult to remove.

The present invention is an insulated removable pond cover which is made in sections which are held together by means of a series of grommets and cables. The cables are secured to a series of concrete deadheads.

The primary advantage of the invention is that it is removable, thus allowing the pond to be dredged and re-used. Another advantage is that the insulation results in heat being retained in the pond, thus speeding biodegradation of organic material.

DESCRIPTION OF THE DRAWINGS

FIG. 1 is a side view of two of the panels.

FIG. 2 is a top perspective view showing two full panels and parts of four other panels, starting from one edge of the pond cover on the left.

DESCRIPTION OF THE INVENTION

The pond cover comprises a plurality of generally rectangular casings or panel units 1 linked together. The number and size of the casings 1 will vary depending upon the size of the pond *10* to be covered, and the casings 1 are arranged in as many rows as are needed. Generally each casing 1 will be about seven and one-half feet wide and approximately forty feet long. Each casing 1 is filled with a layer of insulation 3 and then sealed at either end and along either side by a fusion weld 4. The casings 1 are made of a geomembrane (a high density polyethylene material).

Adjacent casings 1 are linked together in overlapping spaced relationship by means of a grommet and cable system. Each casing 1 is provided with a plurality of grommets 5 at either end and along either side, positioned outside of the welded area 4 so as to not break the seal. The total number of grommets 5 per casing 1 can vary. After the grommets 5 of adjacent casings 1 are lined up in vertical spaced relationship to each other, a cable 7 is passed through the openings of the grommets 5, is formed into a loop above the panels 1 and is secured in position by a cable clamp 11 attached to the cable 7 beneath the casings 1. A heavy tie-down cable 12 is then passed through all the loops of the cables 7 in the row and is secured at either end to an anchor post *20* such as a concrete deadhead, in a conventional manner such as tying the cable 12 to a rod with a nut at either end and securing the cable 12 with a cable clamp. If wind getting underneath the cover is a problem, additional cables can be passed through the cable loops 7 perpendicular to cable 12 at either end and in the middle of the series of casings 1.

Once the pond cover has been secured in position, it will float upon the liquid in the pond, and it can be removed when the pond needs to be dredged.

We claim:

1. A pond cover comprising a plurality of panel units linked together; means for insulating said pond cover, said insulating means comprising a generally rectangular layer of insulation wherein each of said panel units is filled internally with said layer of insulation and is sealed at either end and along either side by welding; and means for linking said panel units together and securing said pond cover in position on a pond, said linking means comprising grommets disposed along said sealed end of each of said panel units, and each of said panel units is linked in vertical spaced relationship to an adjacent panel unit by at least one cable disposed through said vertical spaced grommets and formed into a loop projecting above said panel units, and said securing means including a second cable which is disposed through [the] *an* entire row of said loops and is anchored at either of its end to an anchoring means.

*2. The pond cover of claim 1, where the loops disposed through the grommets project both above and below the panel units.*

*3. The pond cover of claim 1, where the loops disposed about the second cable are disposed through said grommets.*

*4. A pond cover comprising:*

*a plurality of panel units linked together;*

*means for insulating the pond cover, the insulating means comprising a generally rectangular layer of insulation where each of the panel units is filled internally with the layer of insulation and is sealed at either end and along either side by welding; and*

*means for linking the panel units together and securing the pond cover in position on a pond, the linking means comprising grommets disposed along the sealed end of each of the panel units, and each of the panel units is linked in vertical spaced relationship to an adjacent panel unit by at least one cable disposed through the vertical spaced grommets and formed into a loop projecting above the panel units, and the securing means including a second cable which is disposed through a row of the loops and is anchored at either of its end to an anchoring means.*

*5. A cover and wastewater combination comprising:*

*wastewater that includes sewage and/or industrial waste;*

*at least two sealed panels positioned over the wastewater, each panel having a side characterized by an edge and a plurality of openings spaced apart from the edge; and*

*the openings in one of the panels being positioned above the openings in the other panel, and a fastener being disposed through at least two adjacent openings.*

*6. The cover and wastewater combination of claim 5, where the panels are rectangular.*

*7. The cover and wastewater combination of claim 5, where the panels comprise a geomembrane.*

*8. The cover and wastewater combination of claim 5, where the panels are approximately seven and one-half feet wide and approximately forty feet long.*

*9. The cover and wastewater combination of claim 5, where each panel includes insulation material sealed inside, but not completely filling, a void in the panel.*

*10. The cover and wastewater combination of claim 9, where the insulation material is sealed inside each panel by a weld.*

*11. The cover and wastewater combination of claim 9, where the insulation material is rectangular.*

*12. The cover and wastewater combination of claim 5, where the panels further comprises a grommet circumscribing each opening.*

*13. A cover and wastewater combination comprising:*

*wastewater that includes sewage and/or industrial waste; and*

*at least two sealed panels removably linked to each other, the panels being positioned over and in direct contact with the wastewater;*

*where each panel contains, but is not completely filled with, an insulation material.*

*14. The cover and wastewater combination of claim 13, where each panel comprises a geomembrane.*

*15. The cover and wastewater combination of claim 13, where the insulation material is sealed inside each panel by a weld.*

*16. The cover and wastewater combination of claim 13, where each panel includes multiple openings, the panels overlap, and the panels are removably linked to each other with fasteners.*

*17. A cover and wastewater combination comprising:*

*wastewater that includes sewage and/or industrial waste;*

*at least two sealed panels removably linked together in overlapping relationship over the wastewater; and*

*means for removably linking the panels in overlapping relationship, the means comprising fasteners and openings defined in each of the panels;*

*where the openings in one of the panels are positioned above the openings in another of the panels to form pairs of openings of different panels, and one of the fasteners is disposed through each pair of overlapping openings so as to removably link the overlapping panels.*

*18. A cover comprising:*

*a plurality of panels removably linked together, each panel comprising high density polyethylene material; and*

*insulation material sealed inside each panel;*

*where the insulation material inside each panel does not completely fill the panel.*

*19. The cover of claim 18, where each panel includes multiple openings, the panels overlap, and the panels are removably linked together with fasteners.*

*20. A cover comprising:*

*a plurality of panels configured for use over wastewater, the panels being removably linked together with fasteners disposed through overlapping openings of adjacent panel portions;*

*where each panel includes insulation material sealed inside, but not completely filling, a void in the panel.*

*21. The cover of claim 20, where each panel comprises geomembrane.*

*22. The cover of claim 21, where each panel includes multiple openings, the panels overlap, and the panels are removably linked together with fasteners.*

*23. A method of manipulating a cover comprising:*

*linking at least two panels such that the panels are adjacent to each other, where each panel includes insulation material that is sealed inside, but that does not completely fill, a void in the panel; and*

*disposing the panels over wastewater that includes sewage and/or industrial waste.*

*24. The method of claim 23, where each panel comprises geomembrane.*

*25. The method of claim 23, where the insulation material is rectangular.*

*26. The method of claim 23, where each panel comprises openings, and the linking includes placing a fastener through at least one pair of adjacent openings.*

*27. The method of claim 26, where the openings in each panel are adjacent to at least one edge of one side of the panel.*

*28. The method of claim 26, where the linking includes orienting the panels in an overlapping relationship.*

*29. The method of claim 28, further comprising:*

*anchoring the linked panels over the wastewater.*

*30. A method of covering wastewater, comprising:*

*disposing at least two panels over wastewater that includes sewage and/or industrial waste, where the at least two panels are linked to each other and each contains, but is not completely filled with, insulation material sealed inside it.*

*31. The method of claim 30, where each panel comprises geomembrane.*

*32. The method of claim 30, where the insulation material is rectangular.*

*33. The method of claim 30, where each panel comprises openings, and the linking includes placing a fastener through at least one pair of adjacent openings.*

*34. The method of claim 33, where the openings in each panel are adjacent to at least one edge of one side of the panel.*

*35. The method of claim 33, where the linking includes orienting the panels in an overlapping relationship.*

*36. The method of claim 35, further comprising:*

*anchoring the linked panels over the wastewater.*

* * * * *